United States Patent [19]

Utagawa

[11] 4,218,623
[45] Aug. 19, 1980

[54] DEVICE FOR DETECTING DISPLACEMENT OF AN OPTICAL IMAGE

[75] Inventor: Ken Utagawa, Yokohama, Japan

[73] Assignee: Nippon Kogaku K.K., Tokyo, Japan

[21] Appl. No.: 959,918

[22] Filed: Nov. 13, 1978

[30] Foreign Application Priority Data

Nov. 12, 1977 [JP] Japan ................................. 52/135228
Dec. 23, 1977 [JP] Japan ................................. 52/154314
Aug. 24, 1978 [JP] Japan ................................. 53/102259

[51] Int. Cl.² .............................................. H01J 39/12
[52] U.S. Cl. .................................... 250/578; 250/209; 358/105
[58] Field of Search ........................ 250/578, 209, 208; 358/105, 136, 125

[56] References Cited

U.S. PATENT DOCUMENTS 3,700,801  10/1972  Dougherty ............................ 358/125
3,793,523  2/1974   Desvignes et al. ............... 250/578 X

OTHER PUBLICATIONS

E. M. Winter, "3D Fourier Transform Technique for Motion Detection;" IBM Technical Disclosure Bulletin; vol. 19, No. 12, May 1977; pp. 4777-4778, 358-105.
Kowel et al., "Passive Detection of Motion Transverse to the Optical Viewing Axis," IEEE Transactions on Instrumentation and Measurement, Sep. 1975; pp. 248-255, 358-105.

Primary Examiner—David C. Nelms
Assistant Examiner—Edward P. Westin
Attorney, Agent, or Firm—Fitzpatrick, Cella, Harper & Scinto

[57] ABSTRACT

In a device for detecting displacement of an optical image by an image forming optical system in a direction substantially perpendicular to the optic axis of the image forming optical system, there is provided an array of photosensitive elements comprising a plurality of photosensitive elements disposed on or near the image plane of the image forming optical system, means for generating an electrical output creating a phase change in response to the displacement of the optical image in the direction of arrangement of the photosensitive elements in accordance with the outputs of the photosensitive elements of the array, contribution reducing means for reducing the contribution to the electrical output of the outputs of the plurality of photosensitive elements located near the opposite ends of the array, and detector means for detecting the displacement of the optical image from the phase information of the electrical output of the electrical output generating means.

15 Claims, 38 Drawing Figures

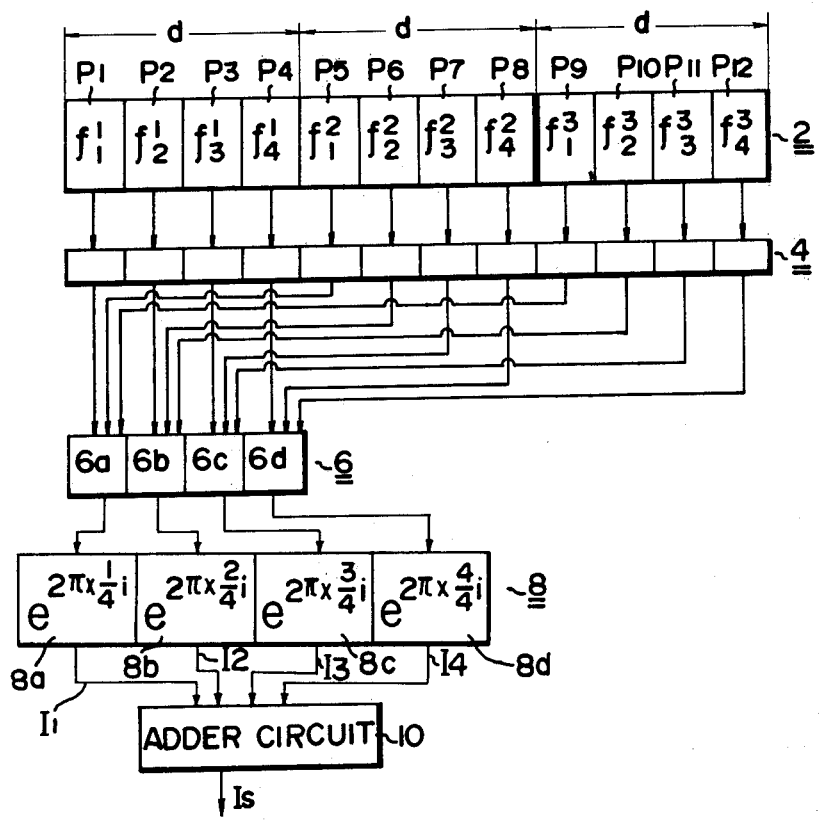
FIG.1
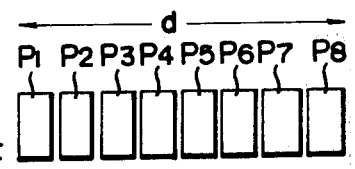
FIG.2a
FIG.2b
FIG.2c

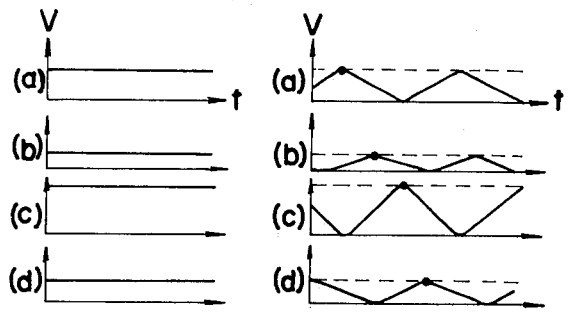
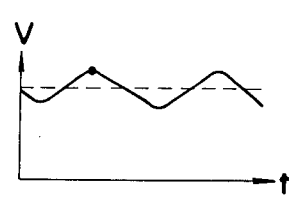
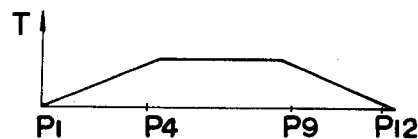
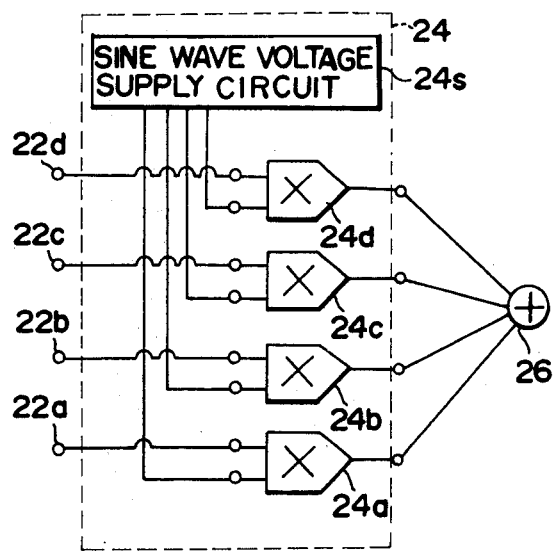

FIG.20a  FIG.21a  FIG.22a
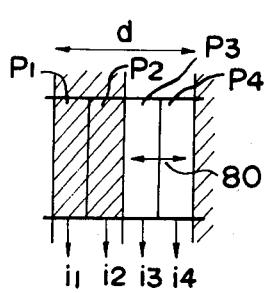 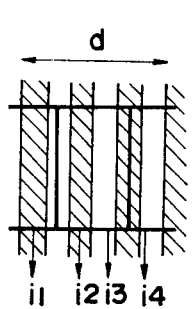 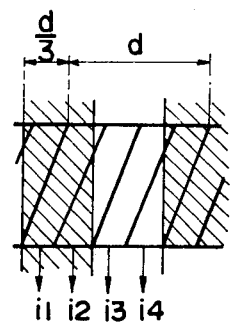
FIG.20b  FIG.21b  FIG.22b
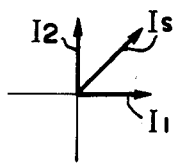 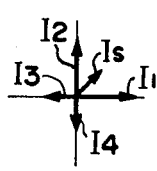 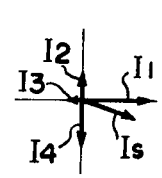
FIG.23a  FIG.24
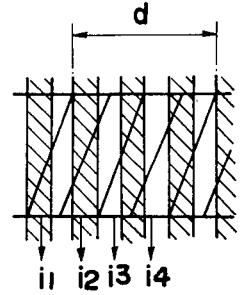 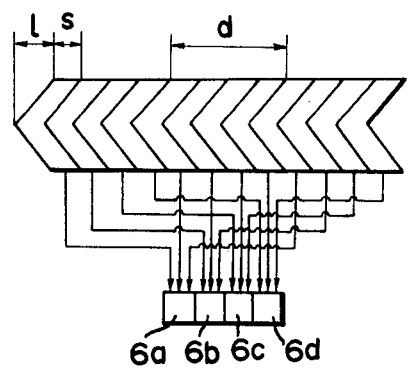
FIG.23b
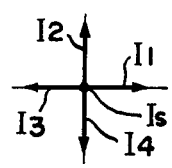

DEVICE FOR DETECTING DISPLACEMENT OF AN OPTICAL IMAGE

BACKGROUND OF THE INVENTION

1. Field of the Invention

This invention relates to a device for detecting relative displacement of an optical image on an array of photosensitive elements as a phase change of an electrical output based on the output of the array, and more particularly to a device for converting the optical image on the array of photosensitive elements into an electrical signal meaning a two-dimensional vector, and for detecting the relative displacement of the optical image as a phase change of the vector thereof.

2. Description of the Prior Art

Detection of displacement of an optical image of an object relative to an array of photosensitive elements enables measurement of movement and velocity of the object and further enables discrimination between focus and defocus of a focusing lens as disclosed in U.S. Pat. No. 4,002,899.

According to the spatial shifting theorem Fourier transforms (see "Introduction to Fourier Optics" J. W. Goodman, McGraw-Hill), translation of a function in the space domain introduces a linear phase shift in the frequency domain. Fourier transform Io(k) of an optical image I(x), with respect to a spatial frequency k, is given by $$Io(k) = \int_{-\infty}^{\infty} I(x) \cdot e^{ikx} dx.$$

Here, the Fourier transform Ih(k) when the optical image I(x) is displaced by h, is given as follows:

$$Ih(k) = \int_{-\infty}^{\infty} I(x + h)e^{ikx}dx = e^{-ikh}Io(k).$$

It is seen from this theorem that knowing the phase term kh of Fourier transform of an optical image leads to knowing the amount of displacement h of the optical image.

In this theorem, attention is drawn to the fact that the integrating section is $[-\infty \cdot \infty]$.

However, when it is tried to obtain a certain Fourier transform, namely a certain spatial frequency component of an optical image by the use of an array of photosensitive elements, displacement of the optical image cannot be detected from the phase change of the Fourier transform where the optical image is of a special illumination distribution, because the length of the array is not infinite, but finite.

SUMMARY OF THE INVENTION

I have conceived and contribute by the present invention a device for detecting displacement of an optical image which can detect relative displacement of the optical image on an array of photosensitive elements as a phase change of an electrical output irrespective of the illumination distribution of the optical image.

According to the main feature of the present invention, there is provided a device for detecting displacement of an optical image by an image forming optical system in a direction substantially perpendicular to the optic axis of the image forming optical system, which comprises:

(a) an array of photosensitive elements comprising a plurality of photosensitive elements disposed on or near the image plane of said image forming optical system;

(b) means for generating an electrical output which creates a phase change in response to the displacement of the optical image in the direction of arrangement of said photosensitive elements in accordance with the outputs of the photosensitive elements of said array;

(c) contribution reducing means for reducing the contribution of the outputs of said plurality of photosensitive elements located near the opposite ends of said array to said electrical output; and (d) detector means for detecting displacement of said optical image from the phase information of the electrical output of said electrical output generating means.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIG. 1 is a block diagram showing the principle of the device for detecting displacement of an optical image according to the present invention;

FIGS. 2A, 2B and 2C illustrate the relation between an array of photosensitive elements and the optical image thereon;

FIGS. 10 to 12 show waveforms in the second embodiment;

FIG. 13 is a graph illustrating the light transmissivity distribution of a filter in the second embodiment;

FIG. 14 is a block diagram showing specific construction of the modulating circuit in the second embodiment;

FIGS. 20A and 20B show the relation between the conventional element array and the optical image thereon, and vector, respectively;

FIGS. 21A and 21B are similar to FIGS. 20A and 20B respectively;

FIGS. 22A and 22B show the relation between the element array according to the present invention and the optical image thereon, and vector, respectively;

FIGS. 23A and 23B are similar to FIGS. 22A and 22B;

FIGS. 24 to 27 are plan views showing modifications of the element array of FIG. 19.

DESCRIPTION OF THE PREFERRED EMBODIMENTS

Figures 3A, 4A:
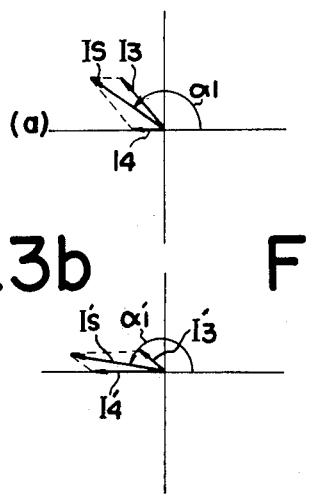
FIGS. 3A, 3B, 4A and 4B are vector diagrams.

In FIG. 1, a photosensitive element array 2 comprising twelve spatially one-dimensionally arranged photosensitive elements P1 to P12 is disposed on or near the focal plane of an unshown image-forming optical system. When an optical image of a certain illumination distribution is focused on this array by the optical system, each element Pn(n=1 ... 12) generates an electrical output f related to the intensity $\bar{f}$ of the light incident thereon. For example, the electrical output f may be proportional to the intensity $\bar{f}$ of the incident light or to the logarithm of $\bar{f}$. For the sake of convenience, the photosensitive elements P1–P12 of this array are divided into three groups; namely, the elements P1–P4 constitute a first element group, the elements P5–P8 constitute a second element group, and the elements P9–P12 constitute a third element group. The intensity of light incident on the nth photosensitive element from left of the mth element group is represented as $\bar{f}_n{}^m$ and the photoelectric output of that element is represented as $f_n{}^m$. The output $f_n{}^m$ of each photosensitive element P is delivered through a contribution reducing means 4, to be described hereinafter, to adder means 6 comprising four adders 6a, 6b, 6c and 6d. The adder 6a adds the output $f_1{}^1$, $f_1{}^2$ and $f_1{}^3$ of the first elements P1, P5, P9 of the respective element groups, the adder 6b adds the outputs of the second elements P2, P6, P10 of the respective element groups, the adder 6c adds the outputs of the third element P3, P7, P11 of the respective element groups, and the adder 6d adds the outputs of the fourth elements P4, P8, P12 of the respective element groups. Where it is desired to obtain electrical outputs proportional to the logarithm of the intensity of light as described above, the outputs of the adders 6a–6d may be logarithmically converted. Vectorizing means 8 has vectorizing circuits 8a, 8b, 8c and 8d for multiplying the outputs of the adders 6a, 6b, 6c and 6d by vector quantities $e^{2\pi \times (1/4)i}$, $e^{2\pi \times (2/4)i}$, $e^{2\pi \times (3/4)i}$ and $e^{2\pi \times (4/4)i}$ which are phase-changed by $2\pi \times \frac{1}{4}$.

Therefore, the outputs $f_1{}^1$, $f_1{}^2$ and $f_1{}^3$ of the first elements of the respective element groups are multiplied by the vector quantity $e^{2\pi \times (1/4)i}$, the outputs $f_2{}^1$, $f_2{}^2$ and $f_2{}^3$ of the second elements are multiplied by $e^{2\pi \times (2/4)i}$, the outputs $f_3{}^1$, $f_3{}^2$ and $f_3{}^3$ of the third elements are multiplied by $e^{2\pi \times (3/4)i}$, and the outputs $f_4{}^1$, $f_4{}^2$ and $f_4{}^3$ of the fourth elements are multiplied by $e^{2\pi \times (4/4)i}$. An adder circuit 10 sums up the outputs I1–I4 of the vectoring circuits 8a–8d.

Accordingly, the output IS of the adder circuit 10 is a composite vector of the vector outputs $I_1$–$I_4$ of the vectorizing circuits and may mathematically be expressed as:

$$IS = \sum_{n=1}^{4} ( \sum_{m=1}^{3} f_n{}^m \cdot e^{2\pi x(n/4)i} )$$

The above example refers to the case where the number of the element groups is three and the number of the photosensitive elements in each group is four, and if this is generalized by substituting M and N for the number of the groups and the number of the elements in each group, the aforementioned output $I_S$ may be expressed as:

$$IS = \sum_{n=1}^{N} ( \sum_{m=1}^{M} f_n{}^m \cdot e^{2\pi x(n/N)i} )$$

As can be seen from this equation, the composite vector output $I_S$ is a quantity related to a certain specific Fourier component namely spatial frequency component of illumination distribution of the image on the element array 2. That is, if the spatial length of each element group is d(mm), the output $I_S$ corresponds to the Fourier component of the optical image with respect to spatial frequency 1/d line/mm.

Thus, by dividing the photosensitive elements of the element array 2 into a plurality of groups of elements and by multiplying the outputs of all elements of the array by a predetermined vector quantity such that as regards the mutual groups, the outputs of the elements of each group belonging to the same position, for example, $f_1{}^1$, $f_1{}^2$, $f_1{}^3$ are multiplied by a vector quantity of the same phase, for example, $e^{2\pi \times (1/4)i}$ and as regards the individual groups, the outputs of the elements in each group are multiplied by a vector quantity whose phase is progressively increased or decreased in the order of the arrangement of the elements, a specific Fourier component, namely, a Fourier component with respect to spatial frequency of the inverse number of the length d of the element group, can be abstracted as the output IS of the adder circuit 10.

Consideration is now given to the variation in the output IS of the adder circuit 10 when the optical image on the element array is displaced to the left in FIG. 1 by an amount corresponding to one photosensitive element. Since the optical image has been displaced to the left by an amount corresponding to one element, the output of the photosensitive element having a magnitude of $f_n{}^m$ is multiplied by a vector quantity $$2\pi x \frac{n-1}{N} i$$

which is phase-changed by 1/N as compared with the phase before the displacement takes place, and the output $I_S'$ of the adder circuit 10 at this time becomes as follows:

$$I_S' = \sum_{n=1}^{N} ( \sum_{m=1}^{M} f_n{}^m e^{2\pi x \frac{n-1}{N} i} ) \quad (1)$$
$$- f_1{}^1 e^{2\pi x(O/N)i}$$

-continued $$+ f_1^{M+1} e^{2\pi x(O/N)i}$$

Here, the second term $-f_1^1 e^{2\pi \times (O/N)i}$ in the right side corresponds to the light $f_1^{-1}$ which was incident on the leftmost element P1 of the array before the displacement of the optical image and which is positioned out of the array after the displacement of the optical image, and the third term $f_1^{M+1} e^{2 \times (O/N)i}$ corresponds to the output $f_1^{M+1}$ of the rightmost element P12 of the array caused by the light $\bar{f}_1^{M+1}$ which is newly incident on the element P12 due to the displacement of the optical image. Equation (1) may be rewritten thus:

$$I_S' = e^{-2\pi x(1/N)i} \quad (1)'$$
$$\{ \sum_{n=1}^{N} ( \sum_{m=1}^{M} f_n^m e^{2\pi x(n/N)i} )$$
$$+ (f_1^{M+1} - f_1^1)e^{2\pi x(1/N)i} \}$$

In this equation, the second term within { } represents the influence of the portion of the image which has come into the array due to the displacement of the image and the portion which has come out of the array, and if this term is sufficiently and negligibly smaller than the first term, this first term is nothing but the output $I_S$ before the displacement takes place and therefore, the difference between the outputs $I_S$ and $I_S'$ of the adder circuit 10 before and after the displacement lies only in the addition of $e^{-2\pi \times (1/N)i}$ to the output $I_S'$. This shows that when the image has been laterally deviated by an amount corresponding to the width of one element, the phase of the output $I_S$ of the adder circuit 10 is increased or descreased by $2\pi/N$ corresponding to the direction of the lateral deviation.

In the foregoing, the variation in the phase of the output IS of the adder circuit 10 due to the displacement of the optical image has been verified by the use of mathematical expressions, and this will now be visually explained by reference to FIGS. 2 to 4. In the ensuing description, an element group, namely, the length d of a spatial period, comprises eight photosensitive elements $P_1$-$P_8$ as shown in FIG. 2A and the optical image projected upon this element group will be considered. The outputs of these eight photosensitive elements are multiplied by vectors which are phase-changed by $2\pi/8$ each in succession by the vectorizing circuit.

Figures 3B, 4B:
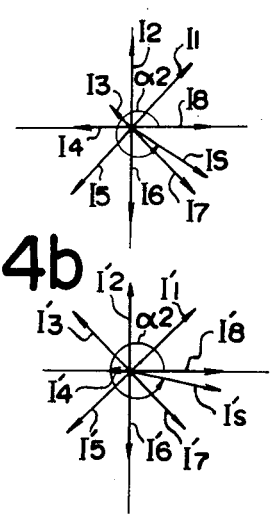

Assume that an optical image having an illumination distribution as shown by solid line in FIG. 2B wherein the illumination on the element P3 is great and the illumination on the element P4 is smaller while the illuminations on the other elements are zero is projected on the eight photosensitive elements P1-P8 as shown in FIG. 2A. Then, the outputs $f_1$, $f_2$ and $f_5$-$f_8$ of the photosensitive elements P1, P2 and P5-P8 are all zero and only the photosensitive elements P3 and P4 generate outputs $f_3$ and $f_4$ ($f_3 > f_4$) of certain values other than zero. Therefore, the outputs I1-I8 of the vectorizing circuit corresponding to the outputs $f_1$-$f_8$ of these photosensitive elements become as follows: $I3 = f3 e^{i2\pi \times 3/8}$, $I4 = f_4 = f_4 x e^{i2\pi \times 4/8}$, $I1 = I2 = I5 = I6 = I7 = I8 = 0$. If this is indicated on a complex plane, the output of the adder circuit may be obtained as a composite vector of I3 and I4, as shown in FIG. 3A. $\alpha 1$ is the phase or argument of the output IS. When the optical image on the array is moved slightly to the right as indicated by dotted line in FIG. 2B and the illumination on the element P4 becomes greater than that on the element P3, the output IS' of the adder circuit at this time may be obtained as a composite vector of the outputs I'3 and I'4 of the elements P3 and P4 at this time, as shown in FIG. 3B. The argument $\alpha'1$ of this adder circuit output $I_S'$ is greater than the previous argument $\alpha 1$. As will be apparent from the foregoing, as the optical image is moved to the right on the array, the argument of this adder circuit output $I_S$ becomes greater.

Now consider the case of the optical image in which the illumination distribution of FIG. 2B is inverted as shown by solid line in FIG. 2C. In this case, the output $I_S$ becomes such as shown in FIG. 4A, and the output $I_S'$ when the optical image has been moved to the dotted-line position becomes such as shown in FIG. 4B and again in this case, the argument $\alpha'2$ of the output $I_S'$ becomes greater than the argument $\alpha 2$ of the output $I_S$.

Incidentally, as will be apparent from the above explanation and the description using the mathematical expressions, the primary variation in the argument of the composite vector $I_S$ accompanying such displacement of the optical image is established in the case of an optical image of such an illumination distribution that the intensity of the light coming into one end of the array is substantially equal to the intensity of the light going out of the other end of the array, but is not always established in the case of an optical image which is not so.

Thus, the present invention provides contribution reducing means 4 in order to ensure the relative displacement of the optical image and the element array to appear as a variation in phase or argument of the output $I_S$ irrespective of the illumination distribution of the optical image.

The function of the contribution reducing means 4 consists in sufficiently reducing the contribution of the outputs of the photosensitive elements in the vicinity of the opposite ends of the element array towards the output $I_S$ of the adder circuit, namely reducing the influence of said outputs on the output $I_S$.

The position of the contribution reducing means 4 in FIG. 1 is not restricted to that shown. As explained in the embodiments to be described, the contribution reducing means 4 may be incorporated in, for example, the photosensitive element 2 or the vector means 8 itself. This contribution reducing means 4 can exert its function the composite vector $I_S$, for example, before the photoelectric conversion of the photosensitive element P (second embodiment) or during that conversion (first embodiment) or during the process of vectorization (third embodiment). In the present specification and claims, it is referred to as reducing the contribution of the outputs of the photosensitive elements to reduce the influence of the outputs of the photosensitive elements near the opposite ends of the array on the composite vector IS.

Figure 5:
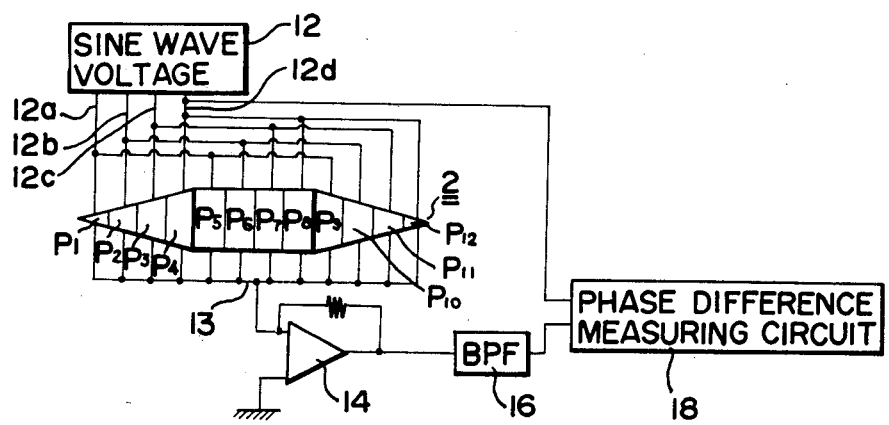
FIG. 5 is a block diagram showing a first embodiment of the present invention.
Figure 6:
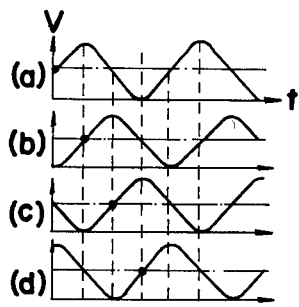
FIGS. 6 and 7 show waveforms in the first embodiment.
Figure 7A:
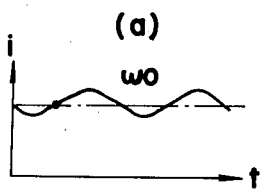
Figure 7B:
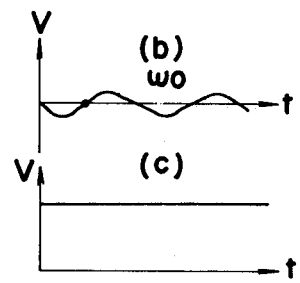

Reference is now had to FIG. 5 to describe a first embodiment of the present invention. In FIG. 5, a sine wave AC voltage supply circuit 12 generates sine wave voltages at its four output terminals 12a, 12b, 12c and 12d as shown in FIGS. 6A, 6B, 6C and 6D, which voltages have an equal angular frequency $W_o$ and are delayed in phase by $2\pi/4$ in succession. The element array 2 comprises three element groups each of which comprises four photoconductive elements ($P_1$, $P_2$, $P_3$, $P_4$), ($P_5$, $P_6$, $P_7$, $P_8$), ($P_9$, $P_{10}$, $P_{11}$, $P_{12}$). The output terminal 12a is connected to one terminal of each of the photoconductive elements P1, P5 and P9 positioned at the top of each group of the element array 2, and the other output terminals 12b, 12c, 12d are connected to the corresponding photoconductive elements P2, P6, P10; P3, P7, P11; P4, P8, P12 of the respective groups. This makes the output current of each photoconductive element proportional to the intensity of the light incident thereon and to the applied AC voltage. That is, the output current of each element proportional to the intensity of light has been modulated by the applied AC voltage. The terminals of the photoconductive elements $P_1$–$P_{12}$ which are not connected to the aforementioned output terminals 12a–12d are commonly connected to a current/voltage converter circuit 14 comprising an operational amplifier, by a lead wire 13. Thus, all the output currents of the photoconductive elements are added and applied to the converter circuit 14. This addition output current so added has an angular frequency $\omega_0$ as shown in FIG. 7A and has information on a Fourier component of the optical image with respect to the spatial period d. This addition output current is converted into a voltage by the converter circuit 14 and an AC component as shown in FIG. 7B is extracted by a band-pass filter 16 of angular frequency $\omega_0$. The amplitude of this AC is proportional to the magnitude of the Fourier component with respect to the desired spatial period d. If the phase difference between the output of the band-pass filter 16 and the output from any one (in FIG. 5, 12d) of the four output terminals of the sine wave voltage supply circuit 12 is obtained by a phase difference measuring circuit 18, there is provided phase information on the desired Fourier component of spatial frequency, whereby the displacement of the optical image can be detected.

When the components of this first embodiment are compared with those of FIG. 1, the sine wave voltage supply circuit 12 corresponds to the vectorizing means 8, the lead wire 13 connecting together the other terminals of the photoconductive elements corresponds to the adder means 6, and the configuration of the light receiving surface of the photoconductive element array 2 corresponds to the contribution reducing means 4.

The configuration of this element array will now be described in detail. The array is constructed such that the maximum lengths or widths of the photosensitive elements in the direction of arrangement of the array are maintained equal, that the light receiving areas of the photosensitive elements P5–P8 of the second group are equal to one another and that the light receiving areas of the photosensitive elements P1–P4 and P9–P12 of the first and third groups are gradually reduced toward the respective ends of the array. Since the light receiving areas of the photosensitive elements adjacent to the opposite ends of the array are reduced toward the ends of the array, the outputs of the elements near the opposite ends of the array are reduced in contribution to the final output IS as compared with the outputs of the elements near the center of the array, so that the change of the phase of the output IS for the displacement of the image can be made smooth.

The smooth reduction in the light receiving areas becomes more effective by smoothly reducing the length of an element in the direction perpendicular to the direction of the arrangement of the array toward the ends of the array, as in the present embodiment.

Especially, rendering the elements P1 and P12 located at the opposite ends of the array into a configuration converging into a point in the direction of arrangement, namely, into the shape of a triangle, is important in that the influence of these two elements at the opposite ends on the phase of the output IS is particularly great.

Figure 8A:
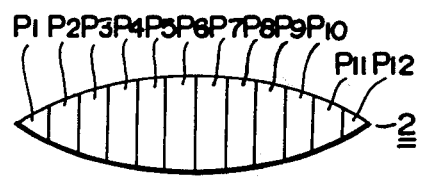
FIGS. 8A and 8B are plan views showing modifications of the photosensitive element array in the first embodiment.
Figure 8B:
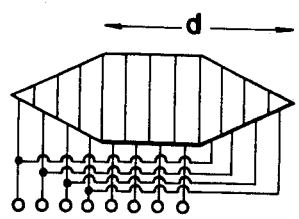

In the above example, the light receiving areas of the elements adjacent to the center of the array 2 are made equal to each other and the light receiving surfaces of the elements adjacent to the opposite ends of the array are linearly varied, but as shown in FIG. 8A, the configuration of the light receiving surfaces of all the elements forming the array may be linearly varied so that the light receiving areas of the respective elements may be reduced from the center toward the opposite ends of the array. For example, if a curved linear shape and a Gaussian shape is selected for the configuration of the array, the outline of the element array at the opposite ends thereof is not always converged into a single point.

Where the light receiving surface areas of the elements are varied, as shown in FIG. 5 or FIG. 8A, the light receiving surface areas may be determined such that the sums of the light receiving surface areas of the sets of elements P1, P5, P9; P2, P6, P10; P3, P7, P11; and P4, P8, P12 which generate outputs to be multiplied by the vector quantity of the same phase, become equal to one another, namely, $P1S+P5S+P9S=P6S+P10S=P3S+P7S+P1S=P4S+P8S+P12S$, where PnS is the light receiving surface area of the element Pn. The reason is to render the output of the circuit 14 zero when an image of uniform illumination distribution is focused on the entire light receiving surface of the array. Also, when the length of one spatial period is dmm, the number of elements into which this length is divided is optional. If, generally, the length is divided into N elements (N is an integer greater than 3), it is preferable to impart phase advance (delay) by $2\pi/N$ to the successive adjacent elements. The number of all elements in the array need not always be an integral multiple of N and for example, the number as shown in FIG. 8B is also possible. In this case, one spatial period d is divided into eight elements, and this array is constituted by twelve photosensitive elements corresponding to 1.5 period, and the light receiving areas of the photosensitive elements coupled to the eight output terminals are equal to one another.

Figure 9:
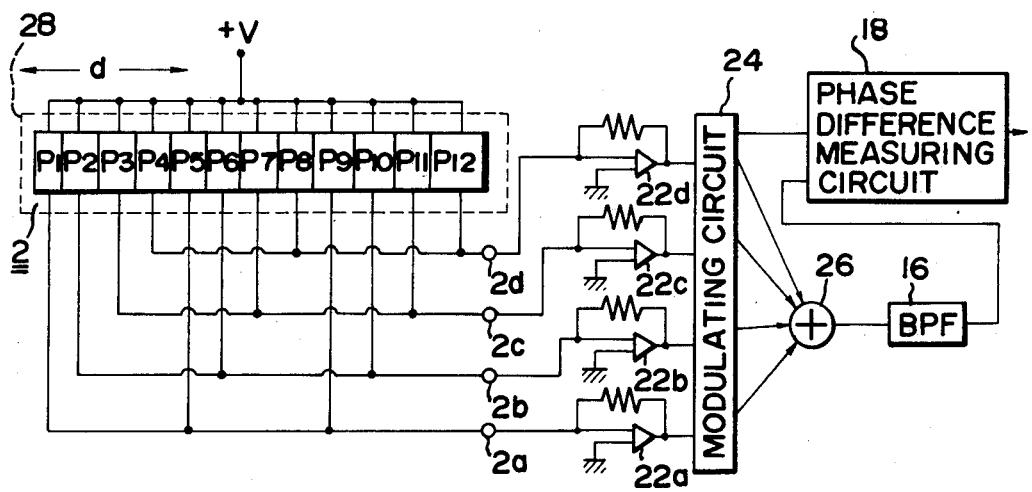
FIG. 9 is a block diagram of a second embodiment of the present invention.

A second embodiment of the present invention will now be described by reference to FIG. 9. The photosensitive elements of the array used in this embodiment may be of any type which converts the intensity of light into an electrical signal substantially proportional thereto. Thus, use may be made of photoconductive elements such as CdS cells, photodiodes or phototransistors. In FIG. 9, a constant potential $+V$ is imparted to each photosensitive element of the element array 2 and therefore, each photosensitive element generates an output substantially proportional only to the intensity of light. The output terminals of the first elements $P_1$, $P_5$ and $P_9$ of the respective groups are all connected to the output terminal 2a of the array 2, and accordingly the outputs of these three elements are added together. Likewise, the corresponding elements $P_2$, $P_6$, $P_{10}$; $P_3$, $P_7$, $P_{11}$; and $P_4$, $P_8$, $P_{12}$ are connected to the output eterminals 2b, 2c and 2d, respectively, and these outputs are added together thereat. Thus, four addition output currents resulting from the addition of three outputs are converted into DC voltages by current/voltage converter circuits 22a, 22b, 22c and 22d, respectively. These output voltages are shown in FIG. 10A, 10B, 10C and 10D. The DC voltages of FIG. 10A, 10B, 10C and 10D have values proportional to tne sum of the intensities of light of the photosensitive elements $P_1$, $P_5$, $P_9$, the sum of the intensities of light of the photosensitive elements $P_2$, $P_6$, $P_{10}$, the sum of the intensities of light of the photosensitive elements $P_3$, $P_7$, $P_{11}$, and the sum of the intensities of light of the photosensitive elements $P_4$, $P_8$, $P_{12}$. A modulating circuit 24 modulates the DC voltages of FIG. 10A, 10B, 10C and 10D into AC voltages of FIGS. 11A, 11B, 11C and 11D, respectively. These AC voltages have an equal angular frequency $\omega_0$ or the amplitudes thereof are proportional to the voltage of FIGS. 10A–10D and the phases thereof are delayed by $2\pi/4$ each. Generally, when one spatial period length d is divided into N as described above, the modulation may be effected with a phase delay of $2\pi/N$. An adder circuit 26 adds together the four outputs of the modulating circuit 24 and generates an AC output of angular frequency $\omega_0$ as shown in FIG. 12. The amplitude of the AC output is proportional to the magnitude of Fourier component with respect to spatial frequency 1/d line/mm, and corresponds to the output of FIG. 7A of the first embodiment. Thereafter, the output of the adder circuit 26 is passed through a band-pass filter 16 and a phase difference measuring device 18 as in the first embodiment, whereby desired information may be obtained.

In the second embodiment, a density filter 28 covering the entire light receiving surface of the element array 2 is used as the contribution reducing means 4. As illustrated in the graph of FIG. 13 in which the ordinate represents the transmissivity T and the abscissa represents the position of the photosensitive elements, the filter 28 has such a transmissivity distribution characteristic that the light transmissivity near the opposite ends of the array is smoothly decreased toward each end. Of course, the transmissivity characteristic of this filter may be determined such that the AC component of the output of the adder 26 becomes zero when an image of uniform illumination distribution is formed on the entire array 2.

Further preferably, a filter having such a transmissivity distribution characteristic may be formed as a single layer or a multilayer film on the light receiving surface by a technique such as evaporation or the like and the film may be formed as an anti-reflection film.

FIG. 14 shows a specific example of the modulating circuit 24. A sine wave voltage supply circuit 24S is similar to the voltage supply circuit 12 of FIG. 5 and the four output terminals thereof generate AC voltages having an angular frequency $\omega_0$ delayed in phase by $2\pi/4$ as shown in FIGS. 6A, 6B, 6C and 6D. Multipliers 24a, 24b, 24c and 24d multiply the output voltages of the current/voltage converter circuits 22a, 22b, 22c and 22d by the output voltages of the voltage source 24S delayed by $2\pi/4$ each. To convert the DC outputs of FIGS. 10A–10D into AC outputs which are out of phase with each other by $2\pi/4$, the AC output may also use a rectangular wave instead of the sine wave as shown in FIG. 11. In this case the voltage source 24S may be designed to generate a rectangular wave.

In the two embodiments described above, the outputs of the photosensitive elements related to the intensity of light are modulated by an AC signal to extract the desired Fourier component of spatial frequency, and next, a third embodiment which differs therefrom will be described by reference to FIG. 15.

Figure 15:
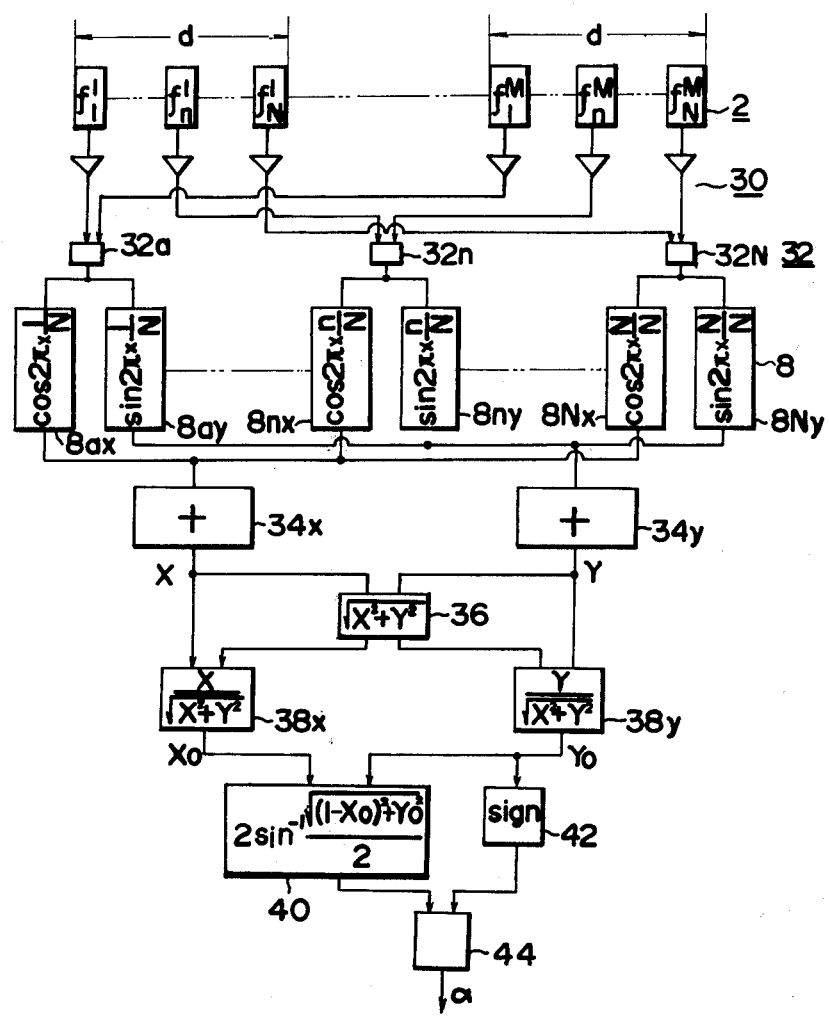
FIG. 15 is a block diagram showing a third embodiment of the present invention.

In FIG. 15, it is assumed that the element array 2 comprises M element groups to provide generality, and that each group comprises N photosensitive elements. In the FIG., only the three photosensitive elements of the first element group and the $M^{th}$ element group, respectively, are shown. The output of each element is amplified by an amplifier 30 to which each element is connected. The amplified outputs are added together by an adder means 32 for each element disposed at the corresponding position of each group. For example, the output $f_1^1 \ldots f_1^M$ of the element disposed at the first position of each group is added by an adder 32a of the adder means. Likewise, for example, the output $f_n^1 \ldots f_n^M$ of the $n^{th}$ element and the output $f_N^1 \ldots f_N^M$ of the $M^{th}$ element are added by adders 32n and 32N, respectively. Vectorizing means 8 multiplies the outputs of the N adders 32a . . . 32n . . . 32N (only three are shown) by vector quantities $ei2\pi \times 1/N \ldots ei2\pi \times n/N \ldots ei2\pi \times N/N$ in the form of X and y components of each vector quantity. For example, the output of the adder 32a is multiplied by $\cos 2\pi \times 1/N$ which is the X component of $ei2\pi \times 1/N$, by a multiplier 8ax and by $\sin 2\pi \times 1/N$ which is the y component of $ei2\pi \times 1/N$, by a multiplier 8ay, and likewise, the output of the adder 32n is multiplied by $\cos 2\pi \times n/N$ by multipliers 8nx and 8ny, respectively, and the output of the adder 32N is multiplied by $\cos 2\pi \times N/N$ and $\sin 2\pi \times N/N$ by multipliers 8Nx and 8Ny, respectively. An adder 34x adds the outputs of multipliers 8ax . . . 8nx . . . 8Nx and adder 34y adds the outputs of multipliers 8ay . . . 8ny . . . 8Ny. Therefore, if the outputs of 34x and 34y are X and Y, respectively, then $$X = \sum_{n=1}^{N} \left( \sum_{m=1}^{M} f_n^m \cos 2\pi \, x \, n/N \right),$$

$$Y = \sum_{n=1}^{N} \left( \sum_{n=1}^{M} \sin s\pi \, xn/N \right)$$

Thus, the vector quantity Is, determined by the outputs X and Y, represents the Fourier component of the optical image with respect to the spatial frequency 1/d line mm where d is the length of each element group, as already described. The argument $\alpha$ of the vector Is(X,Y) is increased or decreased with the displacement of the optical image. In the present embodiment, to reduce the influence of the outputs of the photosensitive elements in the vicinity of the opposite ends of the array, the amplification factor of the amplifier 30 for amplifying the outputs of the elements in the vicinity of the opposite ends of the array is gradually reduced toward the opposite ends of the array. That is, in the present embodiment, the amplifier 30 performs the function of the contribution reducing means 4. Of course, the value of such amplification factor is selected such that the composite vector Is becomes zero when an optical image of uniform illumination distribution is formed on the array. Next, the argument $\alpha$ is sought after.

The outputs X and Y are greatly varied not only by the illumination distribution of the optical image on the element array by also by variation in brightness of the object. Therefore, the absolute value $\sqrt{X^2 + Y^2}$ of the composite vector Is is variable by the brightness of the object is calculated by an operating circuit 36, and $X/\sqrt{X^2+Y^2} = X_0$ is calculated from the output $\sqrt{X^2+Y^2}$ of this circuit 36 and the output X of the circuit 34X by an operating circuit 38x. Likewise $Y/\sqrt{X^2+Y^2} = Y_0$ is calculated from $\sqrt{X^2+Y^2}$ and Y by an operating circuit 38y. These standardized values $X_0$ and $Y_0$ become independent of the brightness of the object or the illumination of the optical image thereof.

Various methods are available to obtain the argument $\alpha$ of the composite vector Is from the standardized outputs $X_0$ and $Y_0$ because X is a many-valued function of $X_0$ and $Y_0$. For example, most simply, $X = \tan^{-1} Y_0/X_0$ may be calculated. However, according to this method, the range over which X is uniformly determined is $-\pi/2 < \alpha < \pi/2$. The present embodiment employs a method of uniformly determining the $\alpha$ in a wider range of $-\pi < \alpha < \pi$. More particularly, there is provided an operating circuit 40 for carrying out the operation $2 \sin^{-1}\{\frac{1}{2}\sqrt{(1-X_0)^2 + Y_0^2}\}$ with $X_0$ and $Y_0$ as the input, and a symbol discriminating circuit 42 for discriminating between the positive and the negative, and from the outputs of the two circuits 40 and 42, an $\alpha$ calculating circuit 44 intactly puts out the output of the operating circuit 40 in accordance with the output of the circuit 42 when $Y_0$ is of a positive value, and puts out the output of the operating circuit 40 with the negative sign given thereto when $Y_0$ is of a negative value. The increase or decrease of the $\alpha$, as already noted, corresponds to the amount and direction of displacement of the optical image on the element array in the direction of arrangement of the array.

Figure 16:
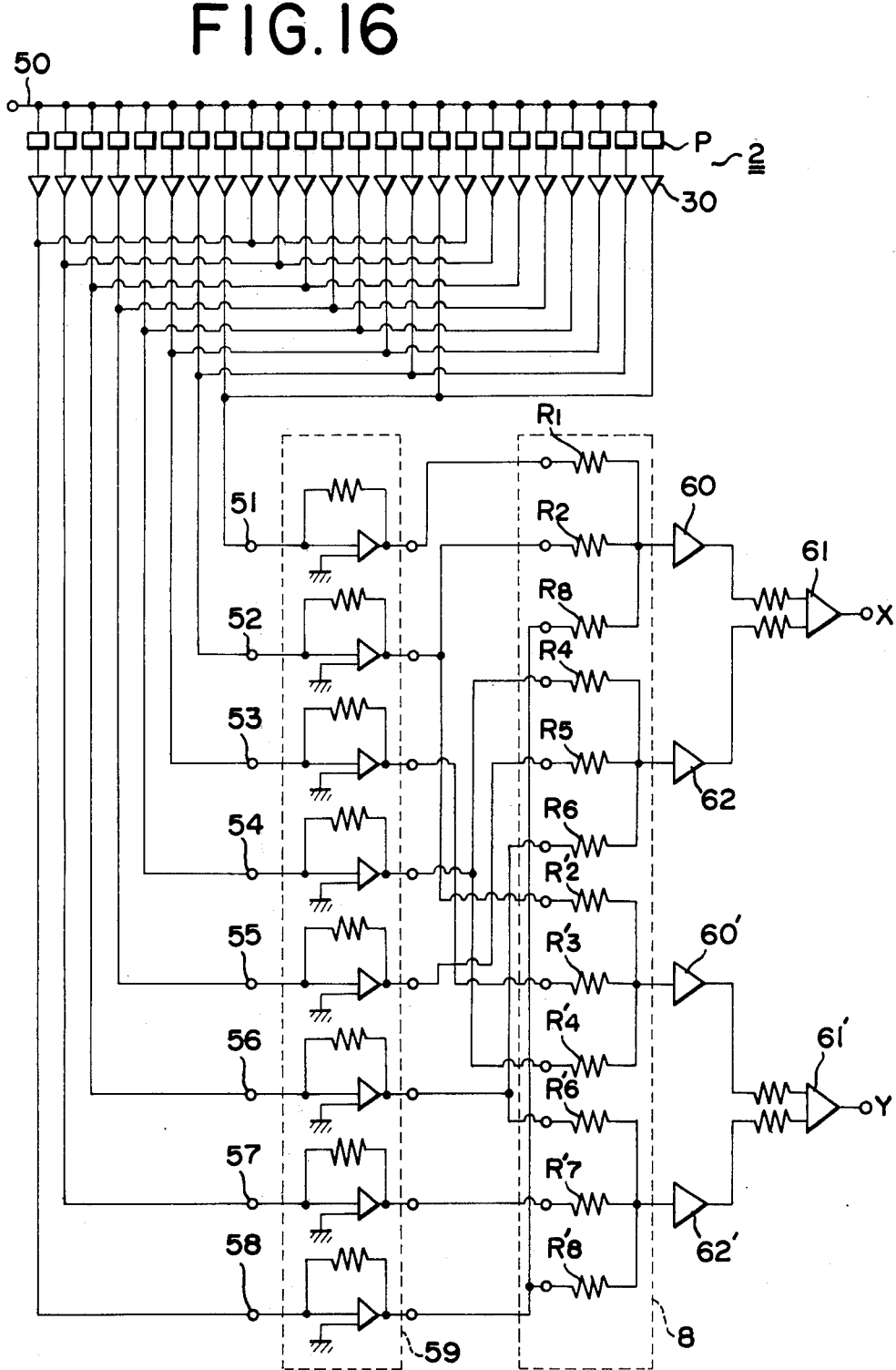
FIG. 16 is a circuit diagram of the third embodiment.

FIG. 16 shows a construction embodying the block diagram of FIG. 15. In this embodiment, M=3 and N=8 and therefore, the element array 2 comprises twenty-four photosensitive elements P such as photoconductive elements or photodiodes, and one end of each of these photosensitive elements is connected to an unshown power source of a common lead wire 50 while the other ends of the photosensitive elements are connected together at every eight elements, and connected to one of eight output terminals 51, 52, 53, 54, 55, 56 57 and 58. Accordingly, the sum of output currents of three elements at every eight elements apears at these eight output terminals 51-58. Each output current is converted into an output voltage by a current/voltage converter circuit 59 having eight circuits. In order to multiply the outputs 51-58 associated with the intensity of light by a vector having an argument offset by $2\pi/8$ each, vectorizing means 8 multiplies eight x-components of the vector $x_1 = \cos 0/8 \times 2\pi$, $x_2 = \cos \frac{1}{8} \times 2\pi$,
$x_3 = \cos 2/8 \times 2\pi$, $x_4 = \cos \frac{3}{8} \times 2\pi$,
$x_5 = \cos 4/8 \times 2\pi$, $x_6 = \cos \frac{5}{8} \times 2\pi$,
$x_7 = \cos 6/8 \times 2\pi$, $x_8 = \cos \frac{7}{8} \times 2\pi$ and y-components of the vector $y_1 = \sin 0/8 \times 2\pi$, $y_2 = \sin \frac{1}{8} \times 2\pi$,
$y_3 = \sin 2/8 \times 2\pi$, $y_4 = \sin \frac{3}{8} \times 2\pi$,
$y_5 = \sin 4/8 \times 2\pi$, $y_6 = \sin \frac{5}{8} \times 2\pi$,
$y_7 = \sin 6/8 \times 2\pi$, $y_8 = \sin \frac{7}{8} \times 2\pi$.

As a specific construction for multiplying the outputs 51-58 by x-components x1-x8, resistors R1-R8 having resistance values inversely proportional to the absolute values of the x-components are prepared and the output terminals 51-58 are connected to one end of the corresponding resistors R1-R8, respectively, while the other ends of the resistors R1, R2 and R8 corresponding to x-components x1, x2 and x8 having positive values are connected to one input terminal of a subtractor 61 through an adder 60 and the other ends of the resistors R4, R5 and R6 corresponding to x-components x4, x5 and x6 having negative values connected to the other input terminal of the subtractor 61 through an adder 62. By this, X may be obtained as the output of the subtractor 61.

Since x3=x7=0, the resistance values of the resistors R3 and R7 are infinity, so that the resistors R3 and R7 are unnecessary and the outputs 53 and 57 are not connected to the vectorizing circuit related to the x-components. Also, the multiplication of the outputs 51-58 by the y-components y1-y8 is likewise effected by the use of resistors R1'-R8', adders 60' and 62' and a subtractor 61'. By this, Y may be obtained as the output of the subtractor 61'.

Figure 17:
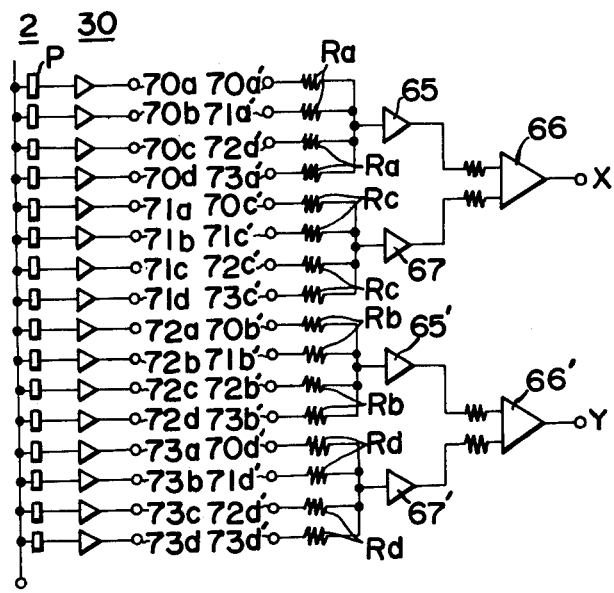
FIG. 17 is a circuit diagram showing a modification of the third embodiment.

A modification of the third embodiment will now be described by reference to FIG. 17. In this modification, the number M of the element groups is M=4 and the number N of the elements in the element groups is N=4. The output of each photosensitive element P is current/voltage converted by an amplifier 30. Since the difference of argument between the two vectors multiplied to the outputs of the adjacent photosensitive elements is $2\pi/4$, the outputs of every four elements in the order of element arrangement are multiplied by the same vector. That is, the outputs 70a, 71a, 72a and 73a of the elements amplified by the amplifier 30 are multiplied by x-component $x1 = \cos 0/4 \times 2\pi(=1)$ of the vector and y-component $y1 = \sin 0/4 \times 2\pi(=0)$, the outputs 70b, 71b, 72b and 73b are multiplied by $x2 = \cos \frac{1}{4} \times 2\pi(=0)$ and $y2 = \sin \frac{1}{4} \times 2\pi(=1)$, the outputs 70c, 71c, 72c and 73c are multiplied by $x3 = \cos 2/4 \times 2\pi(=-1)$ and $y3 = \sin 2/4 \times 2\pi(=0)$, and the outputs 70d, 71d, 72d and 73d are multiplied by $x4 = \cos \frac{3}{4} \times 2\pi(=0)$ and $y4 = \sin \frac{3}{4} \times 2\pi(=-1)$.

As a specific construction, four resistors Ra having a value inversely proportional to the absolute value of the vector component x1, four resistors Rc having a value inversely proportional to the absolute value x3, four resistors Rb having a value inversely proportional to the absolute value of y2, and four resistors Rd having a value inversely proportional to the absolute value of y4 are prepared, and output terminals 70a, 71a, 72a and 73a are connected to the resistors Ra, output terminals 70b, 71b, 72b and 73b are connected to the resistors Rb, output terminals 70c, 71c, 72c and 73c are connected to the resistors Rc, and output terminals 70d, 71d, 72d and 73d are connected to the resistors Rd. Designated by 65, 67, 65' and 67' are adders, and 66 and 66' are subtractors. In FIG. 16, the terminals 70a-73d should be connected to terminals 70'-73d', respectively, but are not shown to be so connected, to avoid complication of the showing.

With such an arrangement, the amplification factor of the amplifiers 30 connected to the photosensitive elements P in the vicinity of the array 1 because of the action of the contribution reducing means 4, for example, the amplifiers 30 connected to the output terminals 70a, 70b, 70c, 70d, 73a, 73b, 73c and 73d may be so determined as to be gradually decreased toward the opposite ends of the array. Or, instead of adjusting the amplification factor of these amplifiers 30, the values of the resistors Ra, Rb, Rc and Rd connected to the output terminals 70a, 70b, 70c, 70d, 73a, 73b, 73c and 73d may be suitably selected to obtain the same effect as described. Also, if the amplifiers 30 are logarithmic amplifiers, an output in a standardized form may conveniently be obtained irrespective of the illumination level of the image which can be treated. In this case, the output does not correspond to the Fourier transformation of the optical image itself, but the relation of the variation in phase of the composite vector output IS to the displacement of the image is expected to be the same as when the logarithmic amplification is not effected.

In the embodiments described above, the processing of electrical signals is analogously effected, but of course the processing may also be effected digitally.

Also, the arrangement of the photosensitive elements is not restricted to the linear arrangement, but the elements may be arranged in a layout corresponding to the direction of displacement of the optical image.

In the foregoing, various examples of the contribution reducing means 4 have been shown and various examples of the system which can provide for composite vector IS have also been shown, whereas the combination of the contribution reducing means and this system is not restricted to the combinations described in connection with the foregoing three embodiments, but any combination is possible. For example, in the second embodiment, instead of the filter 28, the configuration of the array may be such as shown in FIG. 5 or 8.

Figure 18:
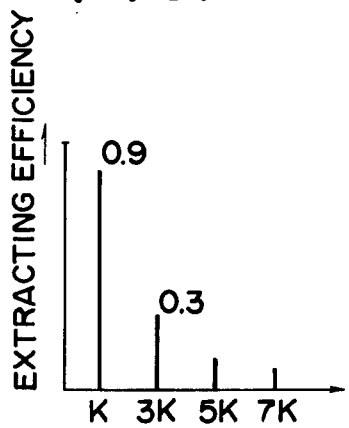
FIG. 18 is a graph illustrating the extraction efficiency of Fourier component: namely spatial frequency component of the optical image with respect to various spatial frequencies.

By the way, in order to extract the Fourier component of the image with respect to a spatial period dmm, the length d of one such period is divided by a limited number ($N \geq 3$) of photosensitive elements, so that Fourier components with respect to spatial frequency of higher order are extracted at the same time in addition to the Fourier component with respect to spatial frequency of the basic spatial period d. Referring to FIG. 18, where one period d is divided by four photosensitive elements as in the above-described example, 90% of the Fourier component with respect to spatial frequency $K=2\pi/d$ of the spatial period d in the optical image and 30% of the Fourier component with respect to spatial frequency 3K are extracted, and some small percentages of the Fourier component with respect to spatial frequency of higher odd-number order such as spatial frequency 5K or 7K are also extracted. Thus, the tertiary Fourier component of spatial frequency 3K is relatively greatly extracted, say, as much as 30% of the extraction efficiency of the basic Fourier component of spatial frequency K. As regards the tertiary Fourier component 3K, the relation between the direction of displacement of the image and the direction in which the phase of the composite vector $I_S$ of the output advances is inverse of that in case of the basic Fourier component K. Therefore, if the direction of deviation of the image is judged with the phase relation of the basic component K as the premise, when an optical image including less of the basic Fourier component K and more of the tertiary component 3K is projected onto the photosensitive element array 2, the direction of displacement of the optical image will be wrongly judged.

Description will now be made of an embodiment in which the influence of the undesirable components of high order is reduced.

Figure 19:
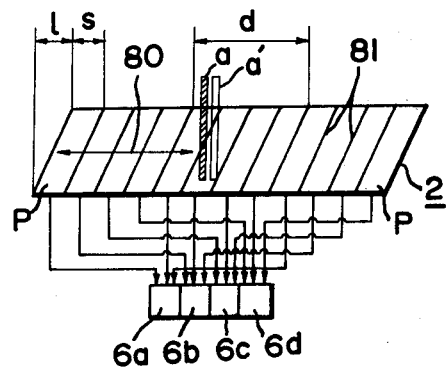
FIG. 19 is a plan view showing an array of photosensitive elements according to another embodiment of the present invention.

In FIG. 19, the widths S of the elements in the direction in which the photosensitive elements P are arranged are equal. d is the length of one period of the Fourier component to be extracted, and because one period d is divided by four photosensitive elements, d=4S. The photosensitive elements P are inclined with respect to the direction 80 of arrangement of the elements. That is, the borderline 81 of a photosensitive element P with respect to its adjacent photosensitive element is not parallel to a line perpendicular to the direction 80 of arrangement but inclined to such perpendicular line. The degree of this inclination is roughly expressed by the following equation.

$$l = d/(N-1) \qquad (2)$$

where l the length of projection of the border line 81 in the direction 80 of arrangement N: the number of the photosensitive elements dividing one period d and in this example N=4.

It is exemplarily illustrated below that the configuration of the so inclined photosensitive elements reduces the influence of the tertiary Fourier component 3K.

FIG. 20A shows the conventional configuration of the elements which are not inclined and the borderline between adjacent elements is parallel to the line perpendicular to the direction 80 of arrangement of the elements P. Consider the case where an optical image of spatial frequency $K=2\pi/d$, namely, an optical image of spatial period d, is projected onto the photosensitive element array 2, as shown. The area of the image which is bright is indicated by hatching and the area of the image which is dark is not indicated by hatching. That is, light reaches the photosensitive elements P1 and P2 but light does not reach the elements P3 and P4. The photoelectric outputs of the elements P1-P4 are converted into vector quantities I1-I4 whch are out of phase by $\pi/2$ each by the vectorizing means 8 of FIG. 1. However, the photoelectric outputs of the elements P3 and P4 are zero, so that $|I3|=|I4|=0$. The composite vector IS of the vector quantities I1-I4 from the optical image of spatial frequency $K=2\pi/d$ is such as shown in FIG. 20B.

FIG. 21A shows the case where an optical image of spatial frequency 3K, namely, an optical image of spatial period d/3 is projected onto these conventional elements. As seen from FIG. 21A, $|I3|=|I4|=\frac{1}{2}|I1|=\frac{1}{2}|I2|$.

FIG. 21B shows the composite vector IS of the vector quantities I1-I4 from an optical image of spatial frequency 3K, and the composite vector IS is not zero. In the photosensitive elements of such a configuration, the tertiary Fourier component of spatial frequency is extracted.

FIG. 22A shows the case where an optical image of spatial frequency K is projected on an element array comprising photosensitive elements inclined according to the present invention. FIG. 22B illustrates the composite vector IS. The degree of inclination is $l = d/N - 1 = d/3$ from the foregoing equation (2).

FIG. 23A shows the case of an optical image of spatial frequency 3K and as seen therefrom, the vector quantities $|I1|=|I2|=|I3|=|I4|$ and thus, the composite vector IS=0. In this case note that the period of the image of spatial frequency 3K is d/3 and attention is drawn to the fact that this is equal to the inclination l.

It is seen from the foregoing examples that when the optical image of the basic spatial frequency k as shown in FIG. 22A is projected onto the photosensitive element array having the pattern of the present embodiment, the composite vector IS occurs but when the optical image of the tertiary spatial frequency 3K as shown in FIG. 23A is projected, the composite vector IS becomes zero. Therefore, the Fourier component with respect to spatial frequency 3K does not adversely affect the detection of the displacement of the optical image.

In order to render zero the magnitude of the composite vector regarding spatial frequency 3K, the inclination of the photosensitive elements is determined so as to satisfy the equation (2), whereas the magnitude of the composite vector regarding 3K need not always be zero but may be as small as not to adversely affect the detection of the displacement of the optical image. For this purpose, the degree of the inclination of the elements may be $$(d/2N) \leq 1 \leq (d/2)$$

The present embodiment enjoys other advantages. Referring to FIG. 19, since the optical image a extending in a direction perpendicular to the direction 80 of arrangement stretches over a plurality of photosensitive elements by all means, the displacement of the optical image a can be detected even if it is displaced by a small distance $\overline{aa'}$ than the width S of the elements.

FIG. 24 shows another example of the pattern according to the present invention, but it is identical in content to the example of the pattern shown in FIG. 19.

Figure 25:
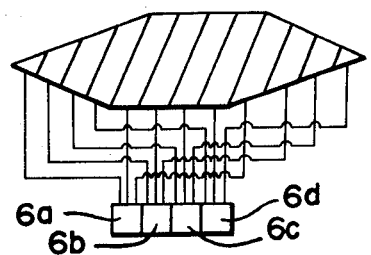
Figure 26:
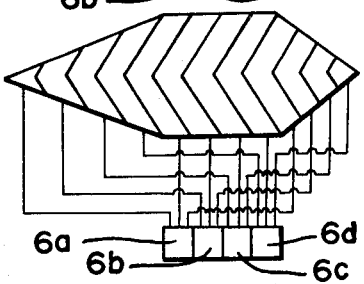
Figure 27:
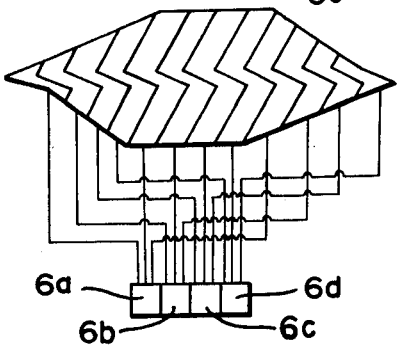

FIGS. 25 to 27 illustrates a combination of the technique whereby the contribution reducing means 4 shown in FIG. 5 is constructed by the configuration of the element array and the technique whereby the influence of the frequency component 3K of high degree is eliminated.

In the above examples, the optical image has been such that the illumination distribution thereof is varied only in the direction of arrangement of the elements and is substantially uniform in the direction perpendicular thereto.

In the case of such an optical image that the illumination distribution is greatly varied in the perpendicular direction as well, it is desirable to convert such an optical image into an optical image in which the illumination distribution is not varied in the perpendicular direction. An example of this will now be shown below.

Figure 28:
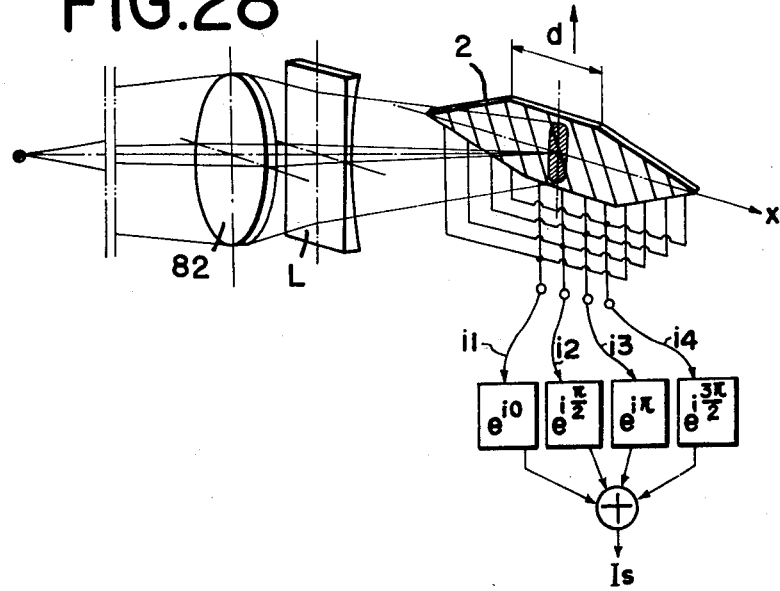
FIG. 28 is a perspective view showing another embodiment using a cylindrical lens.

In FIG. 28, L denotes an image-forming lens and 82 a cylindrical lens which does not have a power in the direction of arrangement of the element array 2 and has a negative power in the direction perpendicular thereto. If the element array 2 is disposed at the fixed focal plane of the image-forming lens L, the image will be focused in the direction of arrangement of the elements and defocused, or blurred in the direction perpendicular thereto. Consequently, there is obtained an image of substantially uniform illumination distribution in the perpendicular direction. The power of the cylindrical lens 82 may suitably be of such a degree that a point image is converted into a linear image having an expanse as great as 0.5 to 1.0 time the length of the element in the perpendicular direction. Since, of course, the function of the cylindrical lens is to blur the optical image only in the direction perpendicular to the direction of arrangement, the cylindrical lens may be a positive lens and the image-forming lens L itself may be the cylindrical lens.

In the present embodiment, the configuration of the elements is improved to reduce the adverse effect of the Fourier component of spatial frequency of high degrees, but such purpose may of course be achieved by the following, too. Since it is desirable that little or no Fourier component of spatial frequency of high degree, say, tertiary degree in the previous example, be present in the optical image projected onto the array, there may be disposed in the optical path of the image-forming lens an optical element of OTF characteristic which will greatly attenuate the component of such high degree. It is also possible to provide the image-forming lens itself with such an OTF characteristic.

In order to provide a variation in phase of the composite vector $I_S$ which accompanies the displacement of an optical image, it is not always necessary to convert the photoelectric output into a vector having an equal phase difference, namely, a phase difference of $2\pi/N$, as in the illustrated embodiment, but it will suffice to convert the photoelectric output into a vector in which the phase is simply increased (or decreased) in the order of arrangement of the elements. However, even in this case, it is preferable that the composite vector output be regulated so as to be zero under uniform illumination.

I believe that the construction and operation of my novel device for detecting displacement of an optical image will now be understood and that the advantages thereof will be fully appreciated by those persons skilled in the art.

I claim:

1. A device for detecting displacement of an optical image by an image forming optical system in a direction substantially perpendicular to the optic axis of the image forming optical system, comprising:
   (a) an array (2) of photosensitive elements (P) comprising a plurality of photosensitive elements disposed on or near the image plane of said image forming optical system (L);
   (b) means (8,10) for generating an electrical output ($I_s$) which creates a phase change in response to the displacement of the optical image in the direction of arrangement of said photosensitive elements in accordance with the outputs of the photosensitive elements of said array;
   (c) contribution reducing means (4) for reducing the contribution of the outputs (f) of said plurality of photosensitive elements located near the opposite ends of said array to said electrical output; and
   (d) detector means (18;40) for detecting displacement of said optical image from the phase information of the electrical output of said electrical output generating means.

2. A device according to claim 1, wherein said contribution reducing means gradually increases the reduction of the contribution of the outputs of said photosensitive elements to the electrical output toward the opposite ends of said array.

3. A device according to claim 2, wherein the rate of reduction of said contribution reducing means is determined such that said electrical output becomes zero when an optical image of uniform illumination distribution is projected onto said array.

4. A device according to claim 3, wherein said electrical output generating means includes vectorizing means (8) for multiplying the outputs of said photosensitive elements in the order of arrangement of the elements by vectors whose phase is successively increased and converting the outputs of said photosensitive elements into a vector, and adder means (10) for adding together the outputs of said photosensitive elements converted into a vector.

5. A device according to claim 4, wherein said vectorizing means multiplies the outputs of said photosensitive elements by vectors whose phases are increased by $2\pi/N$ each in the order of arrangement of the elements, where N is a natural number and is smaller than the number of the photosensitive elements forming said array.

6. A device according to claim 5, further comprising N addition circuits (6) for adding the output of every Nth photosensitive element in the order of arrangement of said photosensitive elements and wherein said vectorizing means multiplies the outputs of said adder circuit by said vector.

7. A device according to any one of claims 1 to 6, wherein said contribution reducing means effects said contribution reduction by gradually decreasing the light receiving area of said plurality of photosensitive elements in the vicinity of the opposite ends of said element array toward the opposite ends of said array.

8. A device according to claim 7, wherein the widths of said photosensitive elements in the direction of arrangement are equal to one another and said light receiving area is decreased by gradually decreasing the length of the photosensitive elements in the vicinity of said opposite ends in the direction perpendicular to the direction of arrangement toward the opposite ends of said element array.

9. A device according to claim 8, wherein the configuration of the photosensitive elements positioned at the opposite ends of the array is determined such that the opposite ends of said element array is converged substantially into a single point.

10. A device according to any one of claims 1 to 6, wherein said contribution reducing means is a filter (28) disposed in front of the light receiving surface of said element array, and the light transmissivity distribution characteristic of said filter is gradually reduced toward the opposite ends of said element array.

11. A device according to any one of claims 1 to 6, wherein said contribution reducing means includes a plurality of amplifier means 30 for amplifying the outputs of the plurality of photosensitive elements in the vicinity of said opposite ends, and the amplification factors of said amplifier means associated with the photosensitive elements in the vicinity of the opposite ends of said array are gradually decreased toward the opposite ends of said array.

12. A device according to any one of claims 4 to 6, 8 or 9, wherein each of said photosensitive elements is configured such that the borderline between adjacent photosensitive elements is inclined with respect to a straight line perpendicular to the direction of arrangement of the elements.

13. A device according to claim 12, wherein the projection length l of said borderline into the direction of arrangement satisfies the relation that $$(d/2N) \lesssim l \lesssim (d/2)$$

where d is N times the width of the photosensitive elements in the direction of arrangement.

14. A device according to claim 13, further comprising optical means (82) for uniforming the illumination distribution of the optical image in a direction perpendicular to the direction of arrangement.

15. A device according to claim 14, wherein said optical means includes a cylindrical lens, and said optical means substantially focuses the optical image on said array in the direction of arrangement but blurs the image in the direction perpendicular thereto.

* * * * *

UNITED STATES PATENT AND TRADEMARK OFFICE
CERTIFICATE OF CORRECTION

PATENT NO. : 4,218,623

DATED : August 19, 1980

INVENTOR(S) : KEN UTAGAWA

It is certified that error appears in the above-identified patent and that said Letters Patent are hereby corrected as shown below:

Col. 5, line 48, after "by" insert --the--;
Col. 5, line 50, after "smaller" insert --,--;
Col. 5, line 51, after "zero" insert --,--;
Col. 5, line 65, change "dotted" to -- the dashed --;
Col. 6, lines 12 and 13, change "dotted" to --dashed--;
Col. 7, line 23, after "AC" insert --component--;
Col. 8, line 23, change "to one another, namely" to --not be so separated--;
Col. 8, line 24, change "+PIS" to -- PLLS --;
Col. 8, line 60, change "eterminals" to --terminals--;
Col. 9, line 39, change "Further preferably" to --Preferably--;
Col. 10, line 14, ei2's should be sub "e"--;
Col. 10, line 58, change "by also by" to --but also by--;
Col. 12, line 43, change "70'" to --70a'--;
Col. 13, line 18, change "(N≥3)" to --(N≥3)--;
Col. 13, line 40, change "of" to --to--;
Col. 13, line 40, change "in case" to --in the case--;

UNITED STATES PATENT AND TRADEMARK OFFICE
CERTIFICATE OF CORRECTION

PATENT NO. : 4,218,623

DATED : August 19, 1980

INVENTOR(S) : KEN UTAGAWA

It is certified that error appears in the above-identified patent and that said Letters Patent are hereby corrected as shown below:

```
Col. 14, line 3, after "is" delete --exemplarily--;
Col. 14, line 3, after "below" add --, by way of example,--;
Col. 14, line 19, change "whch" to --which--;
Col. 15, line 1, change "d/2N)≤ 1 ≤ (d/2)" to --d/2N≤ 1 ≤ d/2--;
Col. 15, line 9, after "a" delete --small--;
Col. 15, line 10, after "aa' add --smaller--;
Col. 15, line 12, change "illustrates" to --illustrate--;
Col. 15, line 43, change "time" to --times--;
Col. 18, line 13, change "length 1" to --Length $\ell$--;
Col. 18, line 15, change "(d/2N)≤ 1 ≤ (d/2)" to
        --d/2N ≤ $\ell$ ≤ d/2--;
Col. 18, line 20, "uniforming" should read --rendering uniform--.
```

Signed and Sealed this

Twenty-first Day of April 1981

[SEAL]

Attest:

RENE D. TEGTMEYER

Attesting Officer     Acting Commissioner of Patents and Trademarks